United States Patent
Mola

(10) Patent No.: US 11,163,665 B2
(45) Date of Patent: Nov. 2, 2021

(54) INDEXING AND REPLAYING TIME-TRAVEL TRACES USING DIFFGRAMS

(71) Applicant: Microsoft Technology Licensing, LLC, Redmond, WA (US)

(72) Inventor: Jordi Mola, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 127 days.

(21) Appl. No.: 16/573,734

(22) Filed: Sep. 17, 2019

(65) Prior Publication Data

US 2021/0081299 A1    Mar. 18, 2021

(51) Int. Cl.
*G06F 11/00* (2006.01)
*G06F 11/36* (2006.01)

(52) U.S. Cl.
CPC .............................. *G06F 11/3636* (2013.01)

(58) Field of Classification Search
CPC . G06F 11/3636; G06F 11/362; G06F 11/3664
See application file for complete search history.

(56) References Cited

U.S. PATENT DOCUMENTS

| | | | | |
|---|---|---|---|---|
| 5,870,607 A * | 2/1999 | Netzer | ................ | G06F 11/3664 717/127 |
| 7,035,866 B1 * | 4/2006 | Chen | ....................... | G06F 16/80 |
| 9,959,194 B1 | 5/2018 | Mola | | |
| 2021/0064512 A1 * | 3/2021 | Sirov | .................. | G06F 9/30058 |

OTHER PUBLICATIONS

Lee, et al., "Offline Symbolic Analysis for Multi-Processor Execution Replay", In Proceedings of the 42nd Annual IEEE/ACM International Symposium on Microarchitecture, Dec. 12, 2009, pp. 564-575.

Narayanasamy, et al., "BugNet: Continuously Recording Program Execution for Deterministic Replay Debugging", In Proceedings of the 32nd International Symposium on Computer Architecture, Jun. 4, 2005, 12 Pages.

"International Search Report and the Written Opinion Issued in PCT Application No. PCT/US20/038252", dated Oct. 13, 2020, 14 Pages.

* cited by examiner

*Primary Examiner* — Joseph D Manoskey
(74) *Attorney, Agent, or Firm* — Workman Nydegger

(57) ABSTRACT

Utilizing diffgrams for trace indexing and replay. A subset of instructions of a trace, beginning with a first instruction and ending with a second instruction, are replayed to obtain state of one or more named resources. Based on replaying the subset of instructions, a diffgram is generated, which is structured such that addition of the diffgram at the first instruction brings the one or more named resources to the second state, and subtraction of the diffgram at the second instruction brings the one or more named resource to the first state. A pat of reaching a target instruction, the diffgram is later added at the first instruction to restore the second state at the second instruction, or subtracted at the second instruction to restore the first state of the first instruction.

20 Claims, 8 Drawing Sheets

100b

Debugging *109*

- Data Access *114*
  - Trace Access *114a*
  - Code Access *114b*

- Indexing *115*
  - Diffgram Generation *115a*
    - Boundary Identification *115a-1*
    - Baseline Identificaion *115a-2*
    - Transformation Generation *115a-3*
    - Diffgram Storage *115a-4*

- Emulation *116*
  - Emulation Steering *116a*
  - Diffgram *116b*
    - Diffgram Identification *116b-1*
    - Diffgram Application *116b-2*

- Output *117*

*FIG. 1B*

INDEXING AND REPLAYING TIME-TRAVEL TRACES USING DIFFGRAMS

CROSS-REFERENCE TO RELATED APPLICATIONS

Not Applicable.

BACKGROUND

Tracking down and correcting undesired software behaviors is a core activity in software development. Undesired software behaviors can include many things, such as execution crashes, runtime exceptions, slow execution performance, incorrect data results, data corruption, and the like. Undesired software behaviors might be triggered by a vast variety of factors such as data inputs, user inputs, race conditions (e.g., when accessing shared resources), etc. Given the variety of triggers, undesired software behaviors can be rare and seemingly random, and extremely difficult reproduce. As such, it can be very time-consuming and difficult for a developer to identify a given undesired software behavior. Once an undesired software behavior has been identified, it can again be time-consuming and difficult to determine its root cause(s).

Developers have conventionally used a variety of approaches to identify undesired software behaviors, and to then identify the location(s) in an application's code that cause the undesired software behavior. For example, a developer might test different portions of an application's code against different inputs (e.g., unit testing). As another example, a developer might reason about execution of an application's code in a debugger (e.g., by setting breakpoints/watchpoints, by stepping through lines of code, etc. as the code executes). As another example, a developer might observe code execution behaviors (e.g., timing, coverage) in a profiler. As another example, a developer might insert diagnostic code (e.g., trace statements) into the application's code.

While conventional diagnostic tools (e.g., debuggers, profilers, etc.) have operated on "live" forward-executing code, an emerging form of diagnostic tools enable "historic" debugging (also referred to as "time travel" or "reverse" debugging), in which the execution of at least a portion of a program's thread(s) is recorded into one or more trace files (i.e., a recorded execution). Using some tracing techniques, a recorded execution can contain "bit-accurate" historic trace data, which enables the recorded portion(s) the traced thread(s) to be virtually "replayed" (e.g., via emulation) down to the granularity of individual instructions (e.g., machine code instructions, intermediate language code instructions, etc.). Thus, using "bit-accurate" trace data, diagnostic tools can enable developers to reason about a recorded prior execution of subject code, as opposed to a "live" forward execution of that code. For example, a historic debugger might provide user experiences that enable both forward and reverse breakpoints/watchpoints, that enable code to be stepped through both forwards and backwards, etc. A historic profiler, on the other hand, might be able to derive code execution behaviors (e.g., timing, coverage) from prior-executed code.

In order to provide user experiences enabling reverse breakpoints/watchpoints, reverse stepping, etc., a debugger replays a trace forwards starting at a point—such as a key frame that contains a snapshot of register and memory values—that is prior to the "current" execution time point that is being presented in the debugger. For instance, suppose that the debugger is presenting, as the current execution time point, the last instruction of a function. Suppose also that the debugger has been instructed (e.g., via user input or by another software component) to reverse (e.g., step back) execution to the first instruction of the function. To accomplish this, the debugger might identify a key frame in the trace that precedes the first instruction of the function. The debugger can then recover initial program state (e.g., processor register values, memory values, etc.) from this key frame, and proceed to replay all the traced instructions between the key frame and the first instruction of the function in order to reconstruct program state at the time of the first instruction. The debugger can then present the first instruction of the function as being the current execution time point, including presenting any of this reconstructed program state. Thus, by replaying forwards from a key frame to reconstruct state for the first instruction, the debugger has provided the illusion of having executed backwards from the second instruction to the first instruction.

Depending on tracing implementations, and other factors (e.g., memory available during tracing, acceptable overheads imposed by tracing, etc.), there may be a significant number of traced instructions between key frames. For instance, in some implementations it might be normal for there to be one to ten million traced instructions between key frames. In these implementations, reversing execution by even one instruction might result in the replay of millions of instructions.

BRIEF SUMMARY

At least some embodiments described herein improve the performance and efficiency of reverse debugging functionality by augmenting a trace with diffgrams, and by utilizing those diffgrams to quickly restore program state to reach a target instruction. Unlike a key frame, which stores a single point-in-time snapshot of register and/or memory values for an entire thread or process that is sufficient to initiate replay from the key frame, a diffgram stores transformation data that can be used to granularly transform a subset of state between two execution time points. This transformation data might be limited in scope to only those changes that occurred to named resources (e.g., memory locations, registers, etc.) between the first and second execution time points. Thus, a diffgram can be much smaller in size than a key frame and it may therefore be practical for them to occur much more frequently than key frames. In addition, unlike key frames, diffgram transformation data can be bi-directional. Thus, with bi-directional transformation data, a diffgram can be "added" to first state at a first instruction to transform the first state into second state at a later second instruction, and this same diffgram can also be "subtracted" at the second instruction to transform the second state into the first state.

In embodiments diffgrams can be based on key frames or other diffgrams, and are composable. For instance, a first diffgram (e.g., which could be based on a key frame) could define a transformation from first state (e.g., obtained from the key frame) at a first instruction to second state at later a second instruction. A second diffgram (e.g., which could be based on the first diffgram) could define a transformation from the second state at the second instruction to third state at a later third instruction. In embodiments, the first and second diffgrams can be added to first state to recover the third state, or can be subtracted from the third state to recover the first state.

Using diffgrams, a tool utilizing the trace (e.g., debugger, profiler, cloud service, etc.) can quickly jump to a target instruction in the trace, without needing to replay all instructions between a key frame and the target instruction. For instance, the tool can jump to an arbitrary target instruction by recovering state from a preceding key frame, and by then adding any intervening diffgrams between the key frame and the target instruction. If the target instruction falls on a diffgram boundary, its state can be recovered without replaying any instruction. If the target instruction falls between diffgram boundaries, the tool can restore state to a diffgram boundary preceding the target instruction, and then replay only those instructions between this boundary and the target instruction. If the tool has already recovered state at some "current" instruction, and if that current instruction falls on a diffgram boundary, the tool can jump back to a target prior instruction by subtracting one or more diffgrams from the state at the current instruction to reach the target prior instruction (i.e., if it falls on a diffgram boundary), or to reach a diffgram boundary just preceding the target prior instruction (i.e., if it falls between diffgram boundaries).

Some embodiments intelligently create diffgrams that have boundaries that fall at "interesting" locations for debugging, such as Application Binary Interface (ABI) boundaries (e.g., function boundaries, kernel call boundaries, etc.) and thread transitions, increasing the likelihood of jumping to (or between) instructions that fall on diffgram boundaries. In embodiments, diffgrams might be created during trace recording, during subsequent trace indexing, and/or during trace replay. For example, one embodiment might create key frames during trace recording, might add diffgrams to the trace at a first granularity during an indexing step, and might create diffgrams in memory at one or more second granularities during trace replay. In a particular example, an embodiment might create key frames in a trace about every three-million instructions during tracing, might insert diffgrams into the trace about every ten-thousand instructions during indexing (while potentially targeting ABI boundaries and tread transitions), and might create in-memory diffgrams during replay about every one-hundred instructions. Embodiments might even create instruction-level diffgrams during trace replay (e.g., for the most recent hundred instructions replayed).

Some embodiments are directed to indexing a trace with a diffgram (e.g., during an indexing phase and/or during trace replay). These embodiments access a replayable trace that records a prior execution of one or more threads of an entity, and identify, within a trace segment recording a prior execution of a sequence of a plurality of instructions of a first thread of the one or more threads, a subset of the sequence of instructions. The subset of instructions begin with a first instruction and end with a second instruction. The subset of instructions is replayed to obtain state of one or more named resources. The one or more named resources have a first state at the first instruction and a different second state at the second instruction. Based on replaying the subset of instructions, a diffgram is generated for the subset of instructions. The diffgram is structured such that addition of the diffgram at the first instruction brings the one or more named resources to the second state, and subtraction of the diffgram at the second instruction brings the one or more named resource to the first state. The diffgram is stored in connection with the trace (e.g., in memory and/or on durable storage).

Other embodiments, which are combinable with the first embodiments, utilize a diffgram to replay a trace. These embodiments access a replayable trace that records a prior execution of one or more threads of an entity and identify, within the replayable trace, a particular instruction within a trace segment recording a prior execution of a sequence of a plurality of instructions of a first thread of the one or more threads. The plurality of instructions include the particular instruction. A set of one or more diffgrams are identified for restoring a prior state of one or more named resources that is needed for emulating the prior execution of the particular instruction. The set of one or more diffgrams are applied to restore the prior state of the one or more named resources. After applying the set of one or more diffgrams, the prior execution of the particular instruction is emulated based on the restored prior state of the one or more named resources.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1B illustrates an example debugging component that creates and/or utilizes diffgrams;

DETAILED DESCRIPTION

Figure 1A:
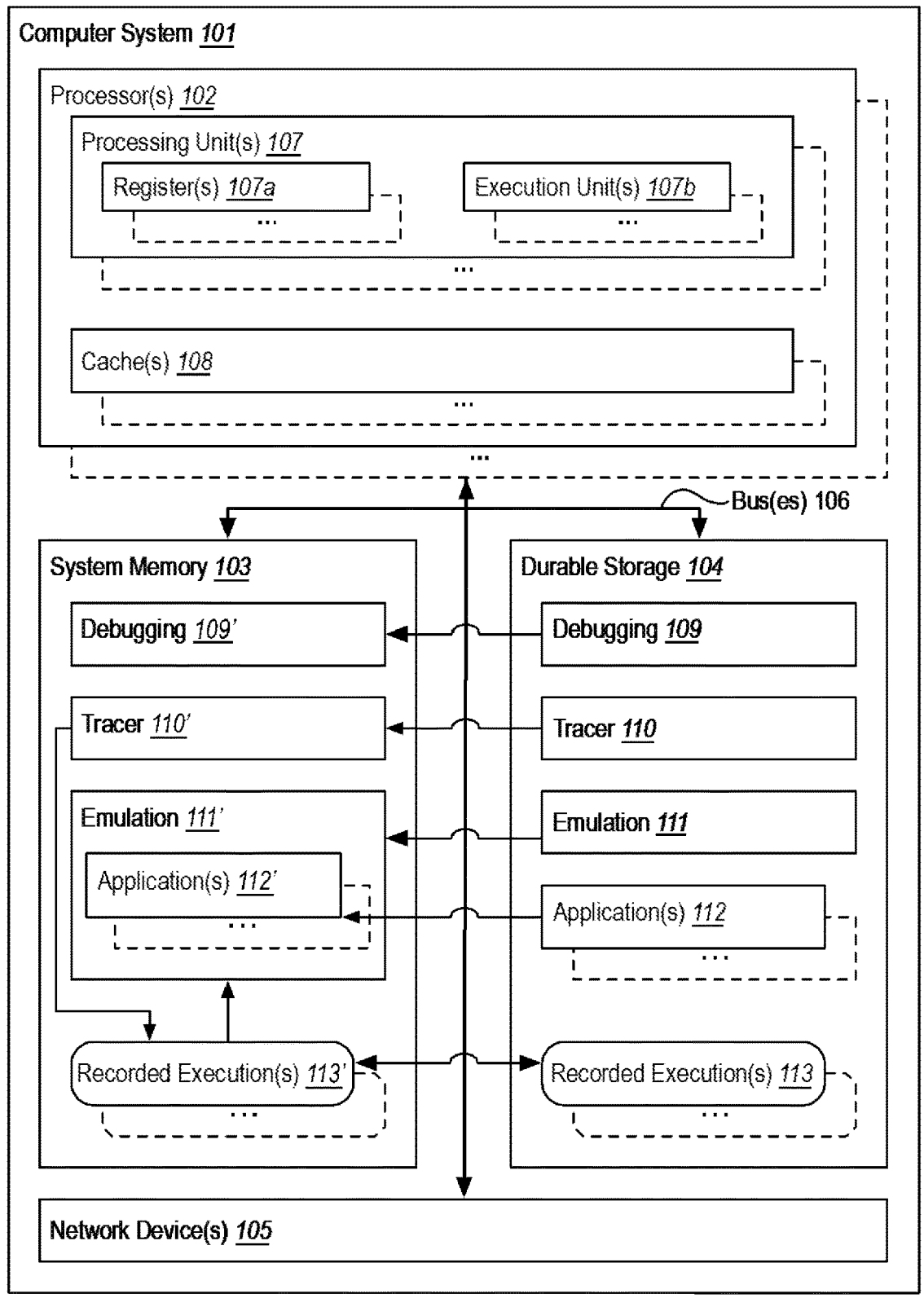
FIG. 1A illustrates an example computing environment that facilitates augmenting a trace with diffgrams and/or utilizing those diffgrams to quickly restore program state to reach a target instruction.

At least some embodiments described herein improve the performance and efficiency of reverse debugging functionality by augmenting a trace with diffgrams, and by utilizing those diffgrams to quickly restore program state to reach a target instruction. Unlike a key frame, which stores a single point-in-time snapshot of register and/or memory values for an entire thread or process that is sufficient to initiate replay from the key frame, a diffgram stores transformation data that can be used to granularly transform a subset of state between two execution time points. This transformation data might be limited in scope to only those changes that occurred to named resources (e.g., memory locations, registers, etc.) between the first and second execution time points. Thus, a diffgram can be much smaller in size than a key frame and it may therefore be practical for them to occur much more frequently than key frames. In addition, unlike key frames, diffgram transformation data can be bi-directional. Thus, with bi-directional transformation data, a diffgram can be "added" to first state at a first instruction to transform the first state into second state at a later second instruction, and this same diffgram can also be "subtracted" at the second instruction to transform the second state into the first state.

In embodiments diffgrams can be based on key frames or other diffgrams, and are composable. For instance, a first diffgram (e.g., which could be based on a key frame) could define a transformation from first state (e.g., obtained from the key frame) at a first instruction to second state at later a second instruction. A second diffgram (e.g., which could be based on the first diffgram) could define a transformation from the second state at the second instruction to third state at a later third instruction. In embodiments, the first and second diffgrams can be added to first state to recover the third state, or can be subtracted from the third state to recover the first state.

Using diffgrams, a tool utilizing the trace (e.g., debugger, profiler, cloud service, etc.) can quickly jump to a target instruction in the trace, without needing to replay all instructions between a key frame and the target instruction. For instance, the tool can jump to an arbitrary target instruction by recovering state from a preceding key frame, and by then adding any intervening diffgrams between the key frame and the target instruction. If the target instruction falls on a diffgram boundary, its state can be recovered without replaying any instruction. If the target instruction falls between diffgram boundaries, the tool can restore state to a diffgram boundary preceding the target instruction, and then replay only those instructions between this boundary and the target instruction. If the tool has already recovered state at some "current" instruction, and if that current instruction falls on a diffgram boundary, the tool can jump back to a target prior instruction by subtracting one or more diffgrams from the state at the current instruction to reach the target prior instruction (i.e., if it falls on a diffgram boundary), or to reach a diffgram boundary just preceding the target prior instruction (i.e., if it falls between diffgram boundaries).

Some embodiments intelligently create diffgrams that have boundaries that fall at "interesting" locations for debugging, such as Application Binary Interface (ABI) boundaries (e.g., function boundaries, kernel call boundaries, etc.) and thread transitions, increasing the likelihood of jumping to (or between) instructions that fall on diffgram boundaries. In embodiments, diffgrams might be created during trace recording, during subsequent trace indexing, and/or during trace replay. For example, one embodiment might create key frames during trace recording, might add diffgrams to the trace at a first granularity during an indexing step, and might create diffgrams in memory at one or more second granularities during trace replay. In a particular example, an embodiment might create key frames in a trace about every three-million instructions during tracing, might insert diffgrams into the trace about every ten-thousand instructions during indexing (while potentially targeting ABI boundaries and tread transitions), and might create in-memory diffgrams during replay about every one-hundred instructions. Embodiments might even create instruction-level diffgrams during trace replay (e.g., for the most recent hundred instructions replayed).

A recorded execution used by the embodiments herein might be generated by a variety of historic debugging technologies. In general, historic debugging technologies record or reconstruct the execution state of an entity at various times, in order to enable execution of that entity to be at least partially emulated later from that execution state. The fidelity of that virtual execution varies depending on what recorded execution state is available.

For example, one class of historic debugging technologies, referred to herein as time-travel debugging, continuously records a bit-accurate trace of an entity's execution. This bit-accurate trace can then be used later to faithfully replay that entity's prior execution down to the fidelity of individual code instructions. For example, a bit-accurate trace might record information sufficient to reproduce initial processor state for at least one point in a thread's prior execution (e.g., by recording a snapshot of processor registers), along with the data values that were read by the thread's instructions as they executed after that point in time (e.g., the memory reads). This bit-accurate trace can then be used to replay execution of the thread's code instructions (starting with the initial processor state) based on supplying the instructions with the recorded reads.

Another class of historic debugging technology, referred to herein as branch trace debugging, relies on reconstructing at least part of an entity's execution state based on working backwards from a dump or snapshot (e.g., a crash dump of a thread) that includes a processor branch trace (i.e., which includes a record of whether or not branches were taken). These technologies start with values (e.g., memory and register) from this dump or snapshot and, using the branch trace to at least partially determine code execution flow, iteratively replay the entity's code instructions and backwards and forwards in order to reconstruct intermediary data values (e.g., register and memory) used by this code until those values reach a steady state. These techniques may be limited in how far back they can reconstruct data values, and how many data values can be reconstructed. Nonetheless, the reconstructed historical execution data can be used for historic debugging.

Yet another class of historic debugging technology, referred to herein as replay and snapshot debugging, periodically records full snapshots of an entity's memory space and processor registers while it executes. If the entity relies on data from sources other than the entity's own memory, or from a non-deterministic source, these technologies might also record such data along with the snapshots. These technologies then use the data in the snapshots to replay the execution of the entity's code between snapshots.

FIG. 1A illustrates an example computing environment 100a that facilitates augmenting a trace with diffgrams and/or utilizing those diffgrams to quickly restore program state to reach a target instruction. As depicted, computing environment 100a may comprise or utilize a special-purpose or general-purpose computer system 101, which includes computer hardware, such as, for example, one or more processors 102, system memory 103, durable storage 104, and/or network device(s) 105, which are communicatively coupled using one or more communications buses 106.

Embodiments within the scope of the present invention can include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media (e.g., system memory 103 and/or durable storage 104) that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network device(s) 105), and then eventually transferred to computer system RAM (e.g., system memory 103) and/or to less volatile computer storage media (e.g., durable storage 104) at the computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, machine code instructions (e.g., binaries), intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

As shown in FIG. 1A, each processor 102 can include (among other things) one or more processing units 107 (e.g., processor cores) and one or more caches 108. Each processing unit 107 loads and executes machine code instructions via the caches 108. During execution of these machine code instructions at one more execution units 107b, the instructions can use internal processor registers 107a as temporary storage locations and can read and write to various locations in system memory 103 via the caches 108. In general, the caches 108 temporarily cache portions of system memory 103; for example, caches 108 might include a "code" portion that caches portions of system memory 103 storing application code, and a "data" portion that caches portions of system memory 103 storing application runtime data. If a processing unit 107 requires data (e.g., code or application runtime data) not already stored in the caches 108, then the processing unit 107 can initiate a "cache miss," causing the needed data to be fetched from system memory 103—while potentially "evicting" some other data from the caches 108 back to system memory 103.

As illustrated, the durable storage 104 can store computer-executable instructions and/or data structures representing executable software components; correspondingly, during execution of this software at the processor(s) 102, one or more portions of these computer-executable instructions and/or data structures can be loaded into system memory 103. For example, the durable storage 104 is shown as potentially storing computer-executable instructions and/or data structures corresponding to a debugging component 109, a tracer component 110, an emulation component 111, and one or more application(s) 112. The durable storage 104 can also store data, such as one or more recorded execution(s) 113 (e.g., generated using one or more of the historic debugging technologies described above).

In general, the debugging component 109 leverages the emulation component 111 in order to emulate execution of code of executable entities, such as application(s) 112, based on execution state data obtained from one or more of the recorded execution(s) 113. Thus, FIG. 1A shows that the debugging component 109 and the emulation component 111 are loaded into system memory 103 (i.e., debugging component 109' and emulation component 111'), and that the application(s) 112 are being emulated within the emulation component 111' (i.e., application(s) 112'). As will be explained in more detail in connection with FIG. 1B, the debugging component 109 can provide functionality for indexing a recorded execution 113 of an application 112 with diffgrams and/or for replaying a prior execution of an application 112 from a recorded execution 113 while relying on diffgrams. The debugging component 109 can correspond to any type of tool that consumes a recorded execution 113 as part of analyzing a prior execution of an application 112. For instance, the debugging component 109 might be a debugger, a profiler, a cloud service, etc.

In general, the tracer component 110 records or "traces" execution of one or more of application(s) 112 into the recorded execution(s) 113 (e.g., using one or more types of the historic debugging technologies described above). The tracer component 110 can record execution of application(s) 112 whether that execution be a "live" execution on the processor(s) 102 directly, whether that execution be a "live" execution on the processor(s) 102 via a managed runtime, and/or whether that execution be an emulated execution via the emulation component 111. Thus, FIG. 1A also shows that the tracer component 110 is also loaded into system memory 103 (i.e., tracer component 110'). An arrow between tracer component 110' and recorded execution(s) 113' indicates that the tracer component 110' can record trace data into recorded execution(s) 113' (which might then be persisted to the durable storage 104 as recorded execution(s) 113).

Figure 2:
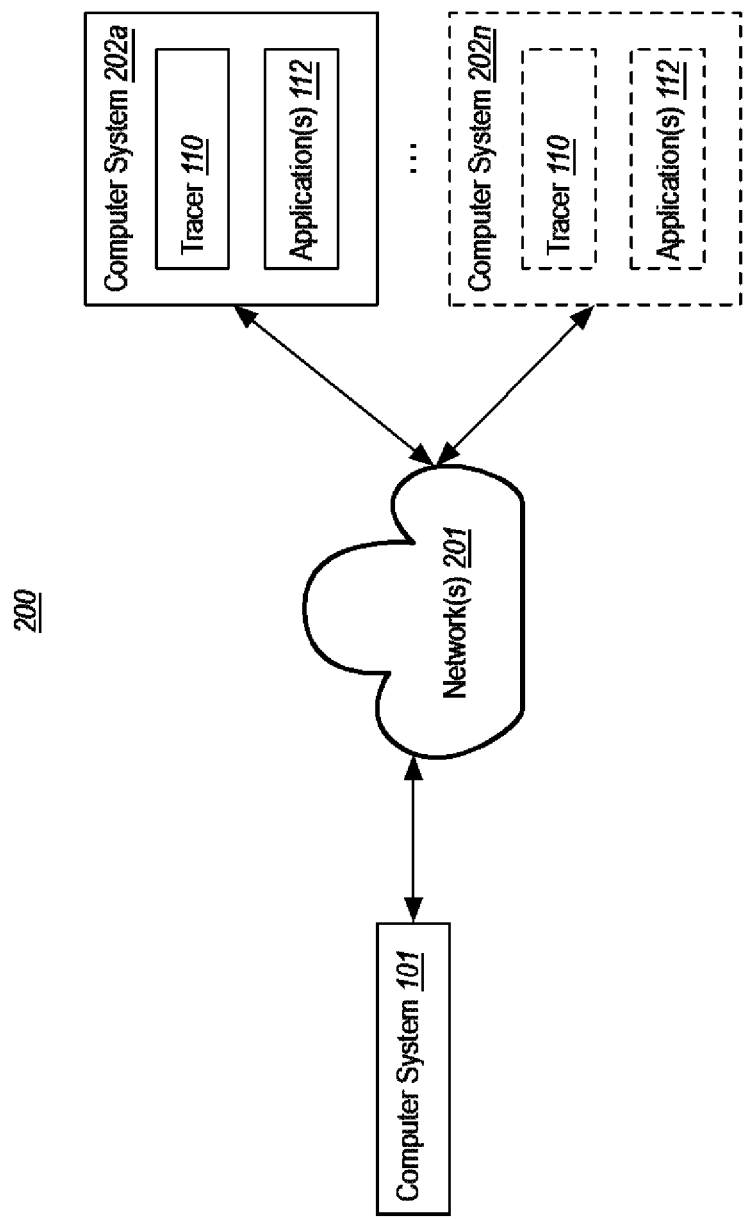
FIG. 2 illustrates an example computing environment in which the computer system of FIG. 1A is connected to one or more other computer systems over one or more networks.

Computer system 101 might additionally, or alternatively, receive one or more of the recorded execution(s) 113 from another computer system (e.g., using network device(s) 105). For example, FIG. 2 illustrates an example computing environment 200 in which computer system 101 of FIG. 1A is connected to one or more other computer systems 202 (i.e., computer systems 202a-202n) over one or more networks 201. As shown in example 200, each computer system 202 includes a tracer component 110 and application(s) 112. As such, computer system 101 may receive, over the network(s) 201, one or more recorded execution(s) 113 of prior execution(s) of one or more of application(s) 112 at these computer system(s) 202.

It is noted that, while the debugging component 109, the tracer component 110, and/or the emulation component 111 might each be independent components or applications, they might alternatively be integrated into the same application (such as a debugging suite), or might be integrated into another software component—such as an operating system component, a hypervisor, a cloud fabric, etc. As such, those skilled in the art will also appreciate that the invention may be practiced in a cloud computing environment of which computer system 101 is a part. For instance, while these components 109-111 might take the form of one or more software applications executed at a user's local computer, they might also take the form of a service provided by a cloud computing environment.

It was mentioned previously that the debugging component 109 can provide functionality for indexing a recorded execution 113 of an application 112 with diffgrams and/or for replaying a prior execution of an application 112 from a recorded execution 113 while relying on diffgrams. To demonstrate how the debugging component 109 might accomplish the foregoing, FIG. 1B illustrates an example 100b that provides additional detail of the debugging component 109 of FIG. 1A. The depicted debugging component 109 in FIG. 1B includes a variety of components (e.g., data access 114, indexing 115, emulation 116, output 117, etc.) that represent various functions that the debugging component 109 might implement in accordance with various embodiments described herein. It will be appreciated that the depicted components-including their identity, sub-components, and arrangement—are presented merely as an aid in describing various embodiments of the debugging component 109 described herein, and that these components are non-limiting to how software and/or hardware might implement various embodiments of the debugging component 109 described herein, or of the particular functionality thereof.

Figure 3:
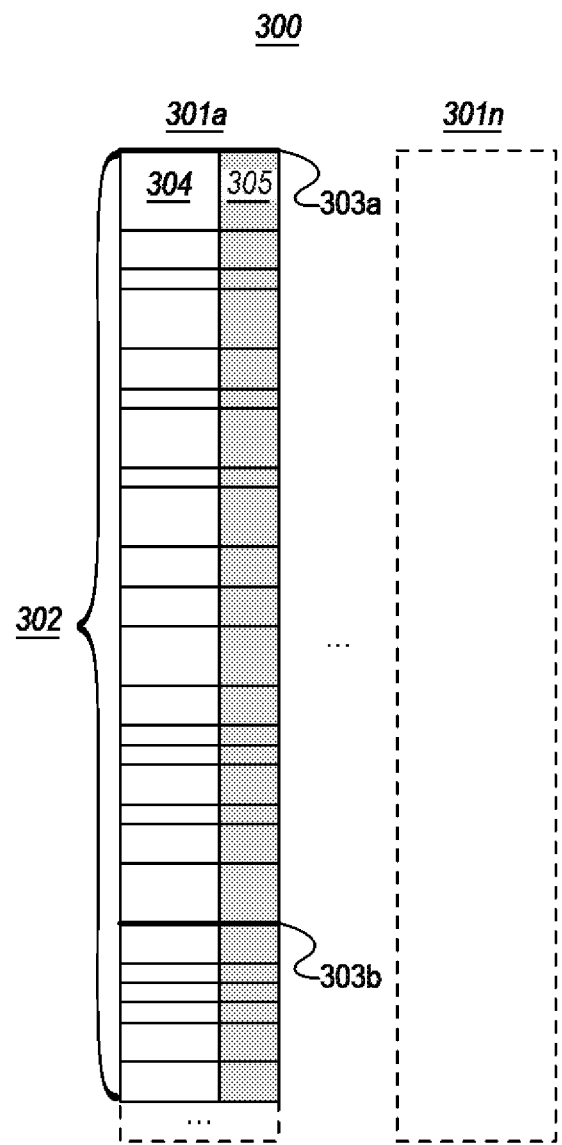
FIG. 3 illustrates an example of a recorded execution of an executable entity.

As shown, the data access component 114 includes a trace access component 114a and a code access component 114b. The trace access component 114a accesses one or more of the recorded execution(s) 113, such as a recorded execution 113 of a prior execution of application 112. FIG. 3 illustrates one example of a recorded execution 300 of an executable entity (e.g., application 112) that might be accessed by the trace access component 114a, where the recorded execution 300 might have been generated using time-travel debugging technologies.

In the example of FIG. 3, recorded execution 300 includes a plurality of data streams 301 (i.e., data streams 301a-301n). In embodiments, each data stream 301 records execution of a different thread that executed from the code of an application 112. For example, data stream 301a might record execution of a first thread of application 112, while data stream 301n records an $n^{th}$ thread of application 112. As shown, data stream 301a comprises a plurality of data packets 302. Since the particular data logged in each data packet 302 might vary, they are shown as having varying sizes. In general, when using time-travel debugging technologies, a data packet 302 might record the inputs (e.g., register values, memory values, etc.) to one or more executable instructions that executed as part of this first thread of application 112. As shown, data stream 301a might also include one or more key frames 303 (e.g., key frames 303a and 303b) that each records sufficient information, such as a snapshot of register and/or memory values, that enables the prior execution of the thread to be replayed by the emulation component 116, starting at the point of the key frame onward.

In embodiments, a recorded execution 113 might also include the actual code that was executed as part of an application 112. Thus, in FIG. 3, each data packet 302 is shown as including a non-shaded data inputs portion 304 and a shaded code portion 305. In embodiments, the code portion 305 of each data packet 302, if present, might include the executable instructions that executed based on the corresponding data inputs. In other embodiments, however, a recorded execution 113 might omit the actual code that was executed, instead relying on having separate access to the code of the application 112 (e.g., from durable storage 104). In these other embodiments, each data packet may, for example, specify an address or offset to the appropriate executable instruction(s) in an application binary image. Although not shown, it may also be possible that the recorded execution 300 includes a data stream 301 that stores one or more of the outputs of code execution.

If there are multiple data streams 301, each recording execution of a different thread, these data streams might include sequencing events. Each sequencing event records the occurrence of an event that is orderable across the threads. For example, sequencing events might correspond to interactions between the threads, such as accesses to memory that is shared by the threads. Thus, for instance, if a first thread that is traced into a first data stream (e.g., 301a) writes to a synchronization variable, a first sequencing event might be recorded into that data stream (e.g., 301a). Later, if a second thread that is traced into a second data stream (e.g., 301b) reads from that synchronization variable, a second sequencing event might be recorded into that data stream (e.g., 301b). These sequencing events might be inherently ordered. For example, each sequencing event might be associated with a monotonically incrementing value, with the monotonically incrementing values defining a total order among the sequencing events. For instance, a first sequencing event recorded into a first data stream might be given a value of one, a second sequencing event recorded into a second data stream might be given a value of two, etc.

Returning to FIG. 1B, the code access component 114b might obtain the code of application 112. If the recorded execution(s) 114 obtained by the trace access component 114a included the traced code (e.g., code portion 305), then the code access component 114b might extract that code from a recorded execution 113. Alternatively, the code access component 114b might obtain the code of application 112 from the durable storage 104 (e.g., from an application binary image).

Figure 4A:
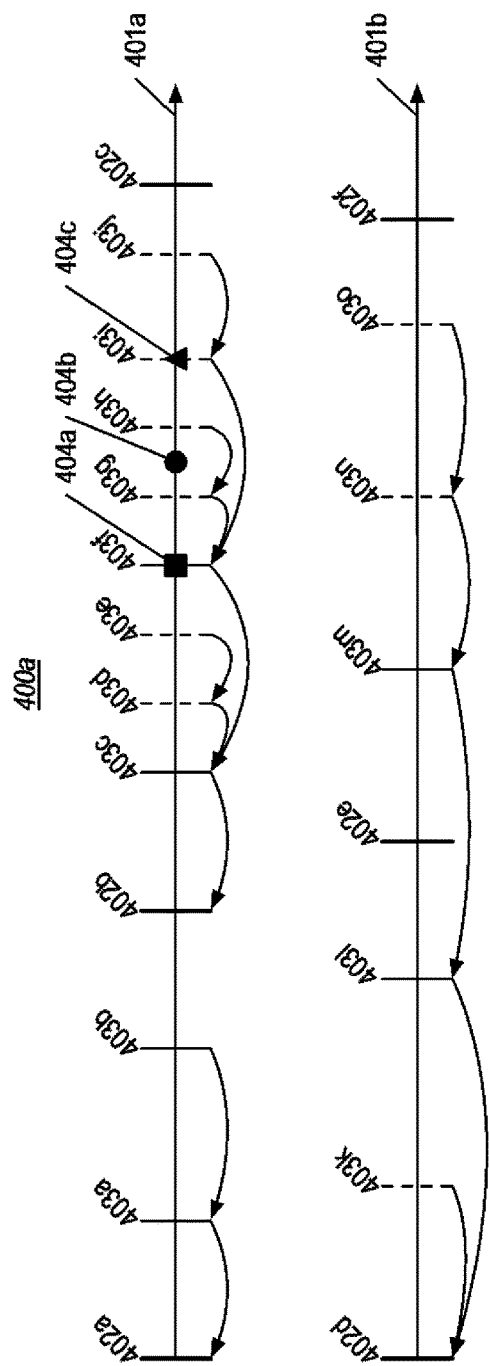
FIG. 4A illustrates a representation of data that might be included in a recorded execution that has been augmented with diffgrams.

To provide context for further description of the indexing component 115 and the emulation component 116, and as an introduction to the structure and use of diffgrams, FIG. 4A illustrates a representation 400 of data that might be included in a recorded execution 113 that has been augmented with diffgrams. Representation 400 includes a timeline representation of portions of two trace data streams 401a and 401b (collectively, trace data streams 401). Each trace data stream 401 might correspond to a different previously-executed thread of one of applications 112, with execution time proceeding from left to right.

Each of these trace data streams 401 includes a plurality of key frames 402a-402f (collectively, key frames 402). For example, key fame 402a might correspond to the beginning of execution of a thread traced by data stream 401a (or the beginning of tracing of the thread) while key frames 402b and 402c are additional key frames along the traced execution of the thread. Key fame 402d, on the other hand, might correspond to the beginning of execution of a thread traced by data stream 401b (or the beginning of tracing of the thread) while key frames 402e and 402f are additional key frames along the traced execution of the thread. These key frames might have been created during tracing (e.g., by the tracer 110), and/or during a subsequent indexing (e.g., by the indexing component 115). These key frames 402 create segments of executable instructions that can be replayed independent of the other segments (both in the same thread and in different threads). For example, the illustrated portion of trace data stream 401a includes two segments of instructions—a first segment between key frame 402a and key frame 402b, and a second segment between key frame 402b and key frame 402c. The illustrated portion of trace data stream 401b also includes two segments of instructions—a first segment between key frame 402d and key frame 402e, and a second segment between key frame 402e and key frame 402f.

Figure 4B:
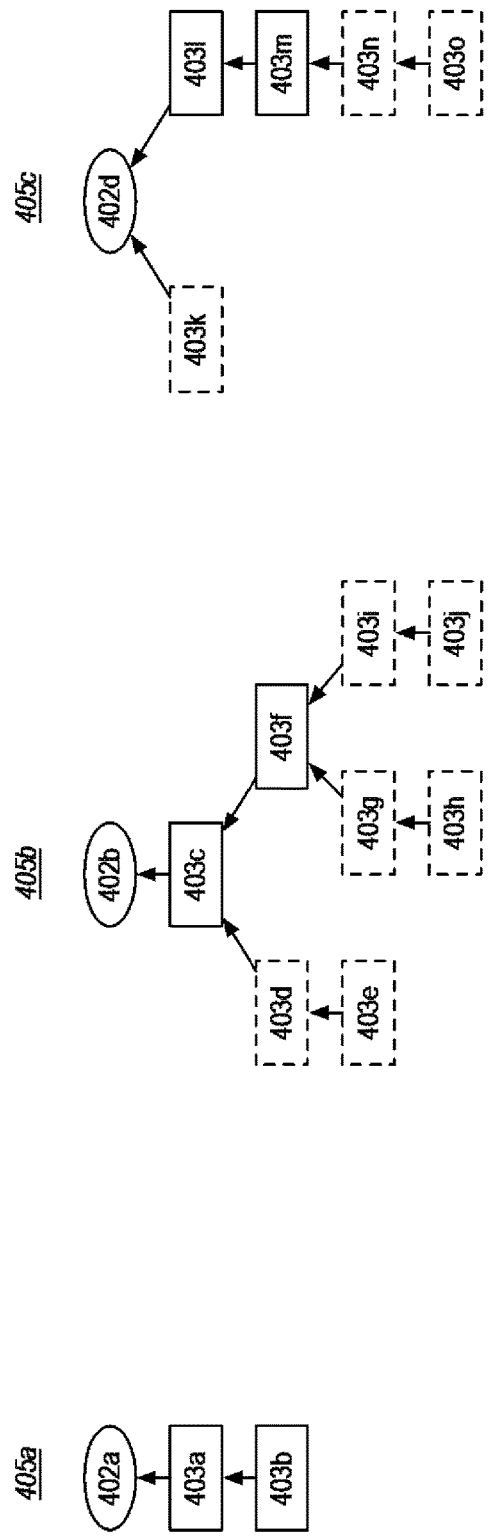
FIG. 4B illustrates tree representations of diffgram dependencies.

Representation 400 also shows a plurality of diffgrams 403a-403o (collectively, diffgrams 403) along the data streams 401. For instance, data stream 401a is shown as including diffgrams 403a-403j, while data stream 401b is shown as including diffgrams 403k-403o. Each diffgram 403 has an arrow pointing to the diffgram 403 or key frame 402 from which it depends (i.e., the diffgram 403 or key frame 402 it uses as its baseline). To further visualize these dependencies, FIG. 4B illustrates tree representations 405a and 405b of the diffgram dependencies along data stream 401a, and illustrates tree representation 405c of the diffgram dependencies along data stream 401b. In representations 405a-405b, oval-shaped nodes represent key frames 402, and rectangle-shaped nodes represent diffgrams 403.

As shown along data stream 401a, and by tree representation 405a, diffgram 403a depends from key frame 402a, and has depending therefrom diffgram 403b. As shown along data stream 401a, and by tree representation 405b, diffgram 403c depends from key frame 402b, and has depending therefrom diffgrams 403d and 403f; in addition, diffgram 403d has depending therefrom diffgram 403e, while diffgram 403f has depending therefrom diffgrams 403g and 403i; diffgram 403g has depending therefrom diffgram 403h, while diffgram 403i has depending therefrom diffgram 403j. As shown along data stream 401b, and by tree representation 405c, diffgrams 403k and 403l depend from key frame 402d; in addition, diffgram 403l has depending therefrom diffgram 403m, which has depending therefrom diffgram 403n, and which has depending therefrom diffgram 403o.

While each diffgram 403 is shown in FIG. 4A occurring at a particular point in a corresponding data stream 401, this is for ease in illustration only. A diffgram defines a transformation between program state at a beginning (first) bounding instruction and program state at a subsequent ending (second) bounding instruction (which might be the same instruction), and there can be a sequence of zero or more additional instructions between these bounding instructions. In FIG. 4A, the lines corresponding to diffgrams 403 can be viewed as representing the ending bounding instruction of each of these transformations. Thus, for instance, diffgram 403a represents a transformation between a first bounding instruction immediately following key frame 402a and a second bounding instruction at the line representing the diffgram 403a. Diffgram 403b, on the other hand, represents a transformation between a first bounding instruction at (or immediately following) the line representing diffgram 403a and a second bounding instruction at the line representing the diffgram 403b. Depending on implementation, the second bounding instruction for diffgram 403a might be the same instruction as the first bounding instruction for diffgram 403b, or these may be different, adjacent, instructions.

If a diffgram is stored within a recorded execution 113 (e.g., by indexing component 115), it might be stored within a trace data stream 301 containing data packets 302 recording execution of instructions of a thread to which the diffgram applies (e.g., a trace data stream recording execution of instructions for a first thread traced by data stream 401a, a trace data stream recording execution of instructions for a second thread traced data stream 401b, etc.), or the diffgram could be stored in some other trace data stream 301 altogether (e.g., data stream devoted to indexing data). If a diffgram is stored within a trace data stream 301 recording execution of instructions of a thread to which the diffgram applies, it could be stored at any location within that data stream 301. For instance, a data structure representing diffgram 403a might be stored within the trace data stream 301 at the line representing diffgram 403a (e.g., one or more data packets 302 at, or near, a data packet 302 recording execution of the second bounding instruction), it could be stored at the beginning of the sequence of instructions covered by the diffgram 403a (e.g., one or more data packets 302 at, or near, a data packet 302 recording execution of the first bounding instruction). Additionally, or alternatively, a data structure representing diffgram 403a could be stored at (or near) the beginning or end of the data stream 301 (e.g., as part of a section of the data stream 301 devoted to indexing data). Additionally, or alternatively, a data structure representing diffgram 403a could be stored at (or near) a key frame upon which it is based (either directly or indirectly). Other storage locations are also possible. Accordingly, the positions of the lines representing diffgrams 403 in FIG. 4A should not be interpreted as indicating a particular location at which a data structure representing a diffgram is stored.

Diffgrams record reversible and composable transformations between program state at a beginning bounding instruction and program state at a subsequent ending bounding instruction. In embodiments, these transformations apply to named resources, such as memory locations (e.g., named by address) and processor registers (e.g., named by register designation). These named resources could include less common named resources as well, such as scratch memory that is available in some processors. Thus, for example, diffgram 403a could record transformations for any named resources that were changed by the set of instructions from diffgram 403a's beginning bounding instruction to diffgram 403a's ending bounding instruction, diffgram 403b could record transformations for any named resources that were changed by the set of instructions from diffgram 403b's beginning bounding instruction to diffgram 403b's ending bounding instruction, and so on. Depending on implementation, these transformations might include transformations that were made by one or both of the bounding instructions, or might exclude transformations that were made by one or both of the bounding instructions.

The particular format of the transformation data can vary widely based on implementation, so long as it has the properties that it is reversible within a given diffgram and composable with transformation data from other diffgrams. For instance, suppose that key frame 402a records the value 0xFFFFFFF0 for a particular named resource, register A. Since diffgram 403a is based on this key frame 402a, the state for register A at the beginning bounding instruction for diffgram 403a is the value 0xFFFFFFF0. Now, suppose that between the beginning and ending bounding instructions for diffgram 403a the value of register A changes to 0xFFFFFFFA. Suppose further that between the beginning and ending bounding instructions for diffgram 403b the value of register A changes to 0xFFFFFF0A. Transformation data for this named resource can contain anything that indicates, or that can be used to compute, the proper value for register A at either end of diffgrams 403a and 403b.

For example, each the diffgram might simply record the value for register A at its beginning and ending instructions. However, space savings might be achieved by recording the transformation in other ways. For instance, the diffgram 403a might record a first reversible mathematical operation (e.g., "A:+0xA") to be applied to the data stored or obtained from the diffgram 403a's baseline (i.e., key frame 402a), while diffgram 403B might record a second reversible mathematical operation (e.g., "A:−0xF0") to be applied to the data stored or obtained from the diffgram 403b's baseline (i.e., diffgram 403a). Thus, "adding" diffgram 403a at the beginning instruction for diffgram 403a could mean obtaining the value 0xFFFFFFF0 for register A from key frame 402a, and then adding 0xA to obtain 0xFFFFFFFA. Additionally, "adding" diffgram 403b at the beginning instruction for diffgram 403b (which might also correspond to the ending instruction of diffgram 403a) could mean subtracting 0xF0 from this calculated value to obtain 0xFFFFFF0A. Alternatively, the value of register A at the ending instruction of diffgram 403b might be known (e.g., due to a prior application of diffgrams 403a and 403b, or due to a prior replay to this point in the trace). Now, "subtracting" diffgram 403b at the ending instruction for diffgram 403b could mean reversing the "A:−0xF0" operation by adding 0xF0 to 0xFFFDFF0A to obtain 0xFFFFFFFA. Further, "subtracting" diffgram 403a at the ending instruction for diffgram 403a (which might also correspond to the beginning instruction of diffgram 403b) could mean reversing the "A:+0xA" operation by subtracting 0xA from this calculated value to obtain 0xFFFFFFF0. While simple addition and subtraction operations have been provided as examples, it will be appreciated that any type of reversible and composable transformations could be used, such as bitwise operations, bit rotations, etc.

Notably, the validity of some named resources, such as memory, may change across diffgrams. For instance, the code between the bounding instructions of a diffgram may have requested that the operating system make some address or address range valid or invalid. In embodiments, diffgrams capture these status changes.

Reversible and composable diffgrams enable the debugging component 109 to quickly jump to arbitrary locations in a trace, to quickly skip forwards from one instruction to a latter instruction, and/or to quickly skip backwards from one instruction to a prior instruction, while reducing (or, in many cases, eliminating) the need to perform forward replay as compared to using only key frames. To demonstrate these concepts, FIG. 4A illustrates three points of interest (POIs): POI 404a represented by a square, POI 404b represented by a circle, and POI 404c represented by a triangle. As examples of using diffgrams to jump to arbitrary locations in a thread's data stream 401a, if the debugging component 109 needs to jump to an instruction at POI 404a, the debugging component can simply recover state from key frame 402b, and then add diffgrams 403c and 403f, without needing to replay any instructions. Similarly, if the debugging component 109 needs to jump to an instruction at POI 404c, the debugging component can also apply diffgram 403i. If the debugging component needs to jump to an instruction at POI 404b, the debugging component can recover state from key frame 402b, and then add diffgrams 403c, 403f, and 403g (without needing to replay any instructions), and then replay only the instructions between the ending instruction of diffgram 403g and the subject instruction.

As examples of using diffgrams to skip forward in the data stream 401a, if the debugging component 109 has already recovered state at POI 404a (e.g., by applying diffgrams and/or by replaying the trace to that point), the debugging component 109 can skip forwards to POI 404b by adding diffgram 403g and then replaying the instructions between the ending instruction of diffgram 403g and POI 404b. Alternatively, if the debugging component 109 has already recovered state at POI 404a, the debugging component 109 can skip forwards to POI 404c by simply adding diffgram 403i. As examples of using diffgrams to skip backward in the data stream 401a, if the debugging component 109 has already recovered state at POI 404c the debugging component 109 can skip backwards to POI 404a by simply subtracting diffgram 403i. Alternatively, if the debugging component 109 has already recovered state at POI 404c, the debugging component 109 can skip backwards to POI 404b by subtracting diffgram 403i, by adding diffgram 403g, and by replaying the instructions between the ending instruction of diffgram 403g and POI 404b.

In embodiments, there can be different diffgram types that capture different scopes of the changes to named resources. For instance, embodiments may include "complete" and "partial" diffgrams. In embodiments, a "complete" diffgram might contain transformations since a base diffgram or base key frame to named resources across all threads, while a "partial" diffgram might contain only transformations since its base diffgram or base key frame that were made by a single thread. In embodiments, a complete diffgram can use a key frame or another complete diffgram as its baseline, while a partial diffgram can use a key frame or either type of diffgram as its baseline. FIGS. 4A and 4B provide examples of complete and partial diffgrams—with complete diffgrams being illustrated using solid lines (i.e., diffgrams 403a-403c, and 403f on data stream 401a and diffgrams 403l and 403m on data stream 401b) and partial diffgrams being illustrated using broken lines (i.e., diffgrams 403d, 403e, 403g-403j on data stream 401a and diffgrams 403k and 403n on data stream 401b).

Use of complete and partial diffgrams provides the ability to limit the number of transformations stored in a diffgram when focusing the diffgram on areas of local interest on a thread. For instance, suppose that POI 404a corresponds to the first instruction of a subject function on data stream 401a, while POI 404c corresponds to the last instruction of the subject function. Here, partial diffgrams 403g-403i (which occur between/at those two POI's) might contain only transformations performed by the subject function. Users are frequently interested in analyzing how a given function behaved on a single thread, while at least temporarily ignoring what is happening on concurrently-executing thread. Partial diffgrams 403g-403i can enable the user to quickly jump to instructions within and at the end of the subject function, without needing to incur the additional overhead of storing and tracking what happened on the thread traced by data stream 401b during the time frame during which the subject function was executing. For instance, if the subject function on data stream 401a operated on memory location X, and if during the same execution time frame the thread traced by data stream 401b operated on memory location Y, one or more of partial diffgrams 403g-403i might store transformations for memory location X, but omit any transformations for memory location Y.

In addition (or as an alternative) to having complete and partial diffgrams, embodiments could apply a variety of other techniques to optimize storage and use of diffgrams. Some of these embodiments might omit some types of information from some diffgrams. For instance, the ABI of a function defines how to set up a stack frame prologue and epilog, which typically uses a predictable pattern of reads and writes to certain registers and/or memory locations. Since the identity of these named resources is predictable, and since the pattern of reads and writes to these named resources are predictable, embodiments might be able to reconstruct state for these named resources without actually storing their transformations in a diffgram. In addition, a partial diffgram might omit any transformations for named resources that are modified by a function, but which have no real effect outside of the context of the function, such as volatile registers, non-volatile registers that are not used outside of the function, etc. Other embodiments might use different diffgrams for different types of named resources (e.g., memory locations versus registers, volatile registers versus non-volatile registers, stack memory versus heap memory, code memory versus runtime memory, etc.).

Notably, a diffgram can be used to determine which named resource(s) have a different value at the ending instruction of the diffgram than they did at the beginning instruction. Thus, diffgrams might be utilized as reverse-lookup indexes to quickly identify at least a subset of which code segment(s) wrote to a given named resource (e.g., for determining which code segment(s) to consider when searching for instructions that trigger a breakpoint). However, having information about which named resource(s) have a different value at the ending instruction of the diffgram than they did at the beginning instruction may not capture all writes. For instance, within the instructions covered by a diffgram, one instruction might add the value 1 to register A, and a later instruction might subtract the value 1 from register A. Here, the value of the register will not have changed from the beginning instruction and the ending instruction, and thus the diffgram might not contain any transformation for register A. Some embodiments might add further information to diffgrams identifying which named resource(s) were written to (or even read by) all instructions covered by the diffgram. With this further information, diffgrams could be utilized as reverse-lookup indexes to quickly identify all code segment(s) that wrote (or touched, if writes are included) to a given named resource. Notably, if a trace lacks diffgrams or other reverse-lookup indexes, locating which instruction(s) in a given segment touched particular named resource is a linear search (e.g., replaying each instruction in the segment). With diffgrams, this can become a binary search (e.g., traversing the tree representations in FIG. 4B to identify which node(s) touched a given named resource).

Returning to FIG. 1B, the indexing component 115 can perform one or more types of indexing operations on the recorded executions 113. As indicated by inclusion of the diffgram generation component 115a, this indexing can include generating diffgrams for one or more of the recorded executions 113. In embodiments, the indexing component 115 could operate as an independent task (e.g., an "offline" indexing pass on a recorded execution 113 that augments the recorded execution 113 with index data, including diffgrams), or could operate in connection with replay of a recorded execution 113 as part of a debugging session (e.g., an "on-the-fly" indexing of trace portions that are replayed as part of the debugging session). Regardless of the type of indexing being performed, the indexing component might utilize the emulation component 116 to replay portions of the recorded executions 113 (e.g., to generate runtime state data for use in the indexing data). Since the indexing component 115 can utilize the emulation component 116, and since indexing might occur as part of a debugging session, there is a double-ended arrow between the indexing component 115 and the emulation component 116, indicating that either component can utilize the other component as part of its operations.

To illustrate use of offline versus on-the-fly indexing, in FIG. 4A it may be that diffgrams 403a, 403b, 403c, 403f, 403i, and 403j on data stream 401a and diffgrams 402d-402f on data stream 401b were created during an "offline" indexing pass and persisted into the trace itself. It may also be that diffgrams 403d, 403e, 403g, and 403h were created "on-the-fly" during a debugging session focused on the segment on data stream 401a between key frames 402b and 402c. These on-the-fly diffgrams might be temporarily stored in system memory 103 and/or might be persisted into the trace. As will be appreciated, creation of these on-the-fly diffgrams during replay might incur little processing overhead (i.e., since those trace sections were being replayed anyway), while enabling the debugging component 109 to quickly move around within this code segment (which is likely to be of particular interest) after the initial replay. While the on-the-fly diffgrams in FIG. 4A are all shown as being partial diffgrams, they could also include (or exclusively comprise) complete diffgrams; however, as will be appreciated, creation of complete diffgrams on-the-fly might require also replaying portions of data stream 401b.

FIG. 1B shows the diffgram generation component 115a as including a boundary identification component 115a-1, a baseline identification component 115a-2, a transformation generation component 115a-3, and a diffgram storage component 115a-4. Regardless of whether indexing is being performed offline or on-the-fly, the boundary identification component 115a-1 can identify a set of instructions for which a diffgram will be created. This includes identifying a set of bounding instructions for the diffgram, including a beginning bounding instruction and an ending bounding instruction, with zero or more instructions in between.

While the boundary identification component 115a-1 could simply identify boundaries at regular intervals, in embodiments the boundary identification component 115a-1 could also identify boundaries at code locations that may be of particular interest during debugging. These could include, for example, ABI boundaries (e.g., before and after function calls, before and after kernel calls, etc.), at thread transitions, when making a call to particular functions or modules that are of interest, etc. In embodiments, the amount of processing devoted to identifying "interesting" boundary locations could depend on the type of indexing being performed (e.g., offline versus on-the-fly), available processing resources during indexing, user preferences, etc.

When identifying boundaries, the boundary identification component 115a-1 might also balance the cost of including a diffgram for particular set of boundaries. This balancing could include, for example, balancing the processing cost of applying the diffgram the processing cost of emulating the instructions this set of boundaries. The balancing could additionally, or alternatively, include considering the memory/storage cost of storing a diffgram for that set of boundaries. The balancing also consider multiple sets of boundaries/diffgrams at once. For instance, the average number of transformations in a given diffgram is likely to increase as the frequency of diffgrams decreases. Additionally, due to the storage overheads of each diffgram, a single diffgram covering one-hundred instructions is likely to be smaller overall than one-hundred diffgrams covering one instruction each (i.e., where the beginning bounding instruction and the ending bounding instruction are the same instruction, and the diffgram captures the changes to named resources made by that single instruction), while one-hundred diffgrams covering one-hundred instructions each are likely to be bigger overall than one diffgram covering ten-thousand instructions. Thus, there can be a tradeoff between average diffgram frequency and average size of the data structures storing the transformations for these diffgrams.

The baseline identification component 115a-2 can determine what to use as the baseline for the diffgram for a given set of boundaries. As discussed, a diffgram can use a key frame or another diffgram as its baseline. The choice as to which key frame or diffgram to use can be based on considerations such as number of named resources that have changed versus a given baseline, a type of the diffgram being created (e.g., partial vs. complete), how a location of the baseline and the current diffgram relate to an interesting location, such as a function, etc. Notably, it may make sense for the baseline identification component 115a-2 to choose a baseline (key frame or diffgram) that is in a different trace segment than the trace segment containing the current set of boundaries. For instance, in FIG. 4A diffgram 403m, which is in the trace segment between key frames 402e and 402f, is based on diffgram 403l, which is in the prior trace segment between key frames 402d and 402e (and which is in turn based on key frame 402d). As an example of why this may make sense, suppose that a function, A, calls another function, B, that key frame 402d corresponds to entry of function A and the line corresponding to diffgram 403m corresponds to the exit of function A, and that key frame 402e falls somewhere within function B. It may make sense to create a diffgram (or set of diffgrams) that cover all of function A (i.e., diffgrams 403l and 403m) because people will often step over the call to A in both directions; in this case, it makes sense to skip the key frame 402e within function B when creating the diffgrams.

Based on the boundaries identified by the boundary identification component 115a-1, and on the baseline structure (key frame or diffgram) identified by the baseline identification component 115a-2, the transformation generation component 115a-3 determines which named resource(s) have changed values at the ending bounding instructions than the baseline, and what transformation(s) will transform the baseline value(s) to the changed value(s). Identifying these changes might include performing a replay from the beginning bounding instruction to the ending bounding instruction utilizing the emulation component 116. As discussed previously, in embodiments these transformations are reversible, so that a transformation can be applied to (i.e., added to) the state of a named resource at its beginning bounding instruction to obtain the appropriate state for the named resource at its ending bounding instruction, and can be applied to (i.e., subtracted from) the state of a named resource at its ending bounding instruction to obtain the appropriate state for the named resource at its beginning bounding instruction. In addition, in embodiments, these transformations are composable, such that a chain of diffgrams can be added and subtracted together.

The diffgram storage component 115a-4 stores one or more data structures representing the transformation(s) created by the transformation generation component 115a-3 in an appropriate location such as in system memory 103 (e.g., as part of runtime data associated with replay of a trace at the debugging component 109), and/or in durable storage 104 (e.g., as part of indexing data for a recorded execution 113).

The emulation component 116 emulates code accessed by the code access component 114b, based on one or more of the recorded executions(s) 113 accessed by the trace access component 114a. For instance, the emulation component 116 might comprise or utilize the emulation component 111 of FIG. 1A to emulate the accessed code. Using the emulation component 116, the debugging component 109 can replay accessed code while steering that code's execution using traced data values from a recorded execution 113. Thus, the emulation component 116 is shown as including an emulation steering component 116a, which can supply code of any emulated code instructions with traced data values, as needed, in order to steer those instruction's emulation to reproduce their traced execution.

The emulation component is also shown as including a diffgram component 116b, which can include a diffgram identification component 116b-1 and a diffgram application component 116b-2. Based on a request to replay/emulate a particular instruction (or group of instructions), the diffgram identification component 116b-1 identifies a set of one or more diffgrams that can be applied in order to reach that instruction (or group of instruction). This may include, for example, identifying one or more diffgrams to add to a key frame, identifying one or more diffgrams to add to already known state (e.g., obtained by a previously applied set of diffgrams and/or obtained by a previous replay), or identifying one or more diffgrams to subtract from already known state (e.g., obtained by a previously applied set of diffgrams and/or obtained by a previous replay). After having identified the appropriate set of diffgrams (including any dependent key frame), the diffgram application component 116b-2 can apply (i.e., add or subtract) those diffgrams to existing or recovered state as needed.

The output component 117 can output the results of any code emulation by the emulation component 116. For example, the output component 117 might visualize code emulation, might present any runtime state produced via application of diffgrams and/or produced via code replay, etc. In embodiments, the output component 117 could provide output to another software component, such as a profiler or other component in a debugging suite.

As will be appreciated, the embodiments described herein can be utilized to generate index data (including diffgrams), as well as to replay a trace in reliance on diffgrams. It will be appreciated that indexing and replay can be viewed as two distinct and independent methods, and they can also be combined into a single method.

Figure 5:
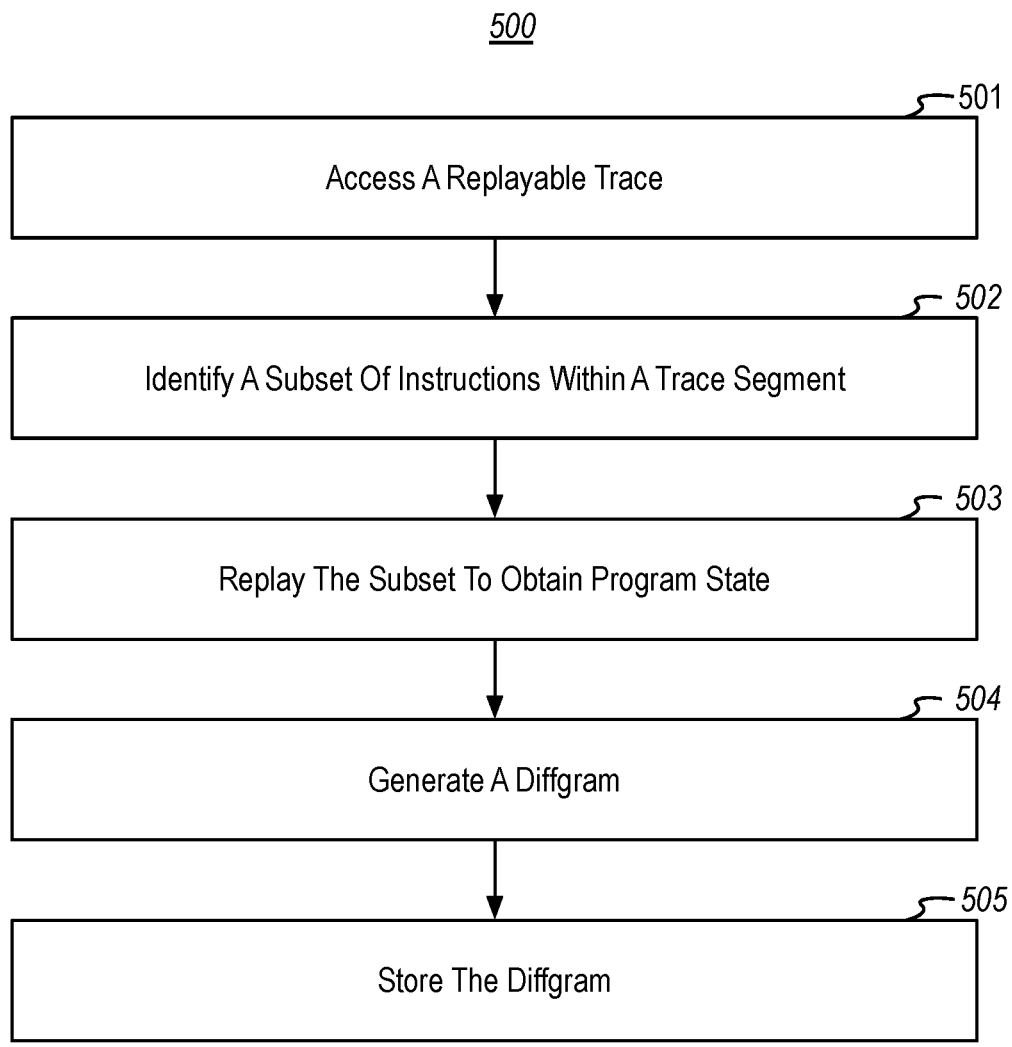
FIG. 5 illustrates a flow chart of an example method for indexing a trace with a diffgram.

In accordance with embodiments for generating index data that includes diffgrams, FIG. 5 illustrates a flowchart of an example method 500 for indexing a trace with a diffgram. Method 500 will now be described within the context of with FIGS. 1-4B. While, for ease in description, the acts of method 500 are shown in a particular sequential order, it will be appreciated that some of these acts might be implemented in different orders, and/or in parallel.

As shown in FIG. 5, method 500 includes an act 501 of accessing a replayable trace. In some embodiments, act 501 comprises accessing a replayable trace that records a prior execution of one or more threads of an entity. For example, the data access component 114 can access one or more recorded executions 113 of an application 112 (e.g., using the trace access component 114a). As shown in FIG. 3, each of these recorded execution(s) 113 might include at least one data stream 301 that includes a plurality of data packets 302; each data packet 302 can include a data inputs portion 304 that records inputs to executable instructions that executed as part of the prior execution of the application. Each trace data stream 301 might include data packets 302 recording a prior execution of one or more threads of the application 112. For instance, trace data stream 301a might correspond to data stream 401a of FIG. 4A, while trace data stream 301n might correspond to data stream 401b.

The recorded execution(s) 113 can include prior "live" executions of the application 112 at the processor(s) 102 directly, or through a managed runtime, or prior emulated executions of the application 112 using the emulation component 116. As such, in act 501, the one or more recorded executions 113 could comprise at least one of a "live" execution of the executable entity, or an emulated execution of the executable entity.

Method 500 also includes an act 502 of identifying a subset of instructions within a trace segment. In some embodiments, act 502 comprises identifying, within a trace segment recording a prior execution of a sequence of a plurality of instructions of a first thread of the one or more threads, a subset of the sequence of instructions, the subset of instructions beginning with a first instruction and ending with a second instruction. For example, the boundary identification component 115a-1 can consider one or more segments of traced instruction execution to identify a subset of those instructions for which a corresponding diffgram will be generated.

Referring to FIG. 4A, for instance, the boundary identification component 115a-1 might consider at least a portion of the segment of instructions whose execution was traced between key frames 402b and 402c on data stream 401a, and identify within that segment a subset of instructions for which a diffgram (e.g., diffgram 403c) will be generated. This subset can begin with a first beginning bounding instruction and end with a second ending bounding instruction. For example, the boundary identification component 115a-1 might identify a subset of instructions beginning with a first instruction after key frame 402b and ending with a second instruction at the line corresponding to diffgram 403c In embodiments, the boundary identification component 115a-1 can identify multiple subsets of instructions for which diffgrams will be generated. Thus, for example, in method 500 the subset of instructions could comprise a first subset of instructions, and act 502 could also include identifying, within the trace segment, second a subset of the sequence of instructions, the second subset of instructions beginning with a third instruction and ending with a fourth instruction. For instance, the boundary identification component 115a-1 might identify a second subset of instructions beginning with a third instruction at the line corresponding to diffgram 403c and ending with a second instruction at the line corresponding to diffgram 403d. This could continue for any number of subsets. Depending on implementation, the second instruction might also be the third instruction, and the second state might also be the third state.

Part of identifying subset(s) of instructions in act 503 might include the baseline identification component 115a-2 identifying a baseline for each subset. As mentioned, a diffgram can use a key frame or a diffgram as its baseline. Thus, in the example subsets above, the baseline identification component 115a-2 might identify key frame 402b as the baseline for the first subset, and might identify diffgram 403c (i.e., corresponding to the first subset) as the baseline for the second subset.

Method 500 also includes an act 503 of replaying the subset to obtain program state. In some embodiments, act 503 comprises replaying the subset of instructions identified in act 502 to obtain state of one or more named resources, the one or more named resources having a first state at the first instruction and a different second state at the second instruction. For example, the transformation generation component 115a-3 can utilize the emulation component 116 to replay execution of the first subset of instructions that were identified in act 502. Based on this replay, the transformation generation component 115a-3 can identify beginning state of one or more named resources at the beginning instruction for the subset, and ending state of these named resources at the ending instruction for the subset.

If multiple subsets were identified in act 502, the act 503 could include replaying each of these subsets. For example, if the second subset was also identified, act 503 could also include replaying the second subset of the sequence of instructions to obtain state of the one or more named resources, the one or more named resources having a third state at the third instruction and a different fourth state at the fourth instruction. This could continue for any number of subsets.

Notably act 503 refers to state "at" an instruction. Depending on implementation, the term "at" could refer either state before execution of the instruction, or state after execution of the instruction.

Method 500 also includes an act 504 of generating a diffgram. In some embodiments, act 504 comprises, based on replaying the subset of instructions, generating a diffgram for the subset of instructions, the diffgram being structured such that addition of the diffgram at the first instruction brings the one or more named resources to the second state, and subtraction of the diffgram at the second instruction brings the one or more named resource to the first state. For example, based on the replay in act 503 of the subset identified in act 502, the transformation generation component 115a might identify one or more named resources whose values were altered between the beginning and ending state for the subset. For each altered named resource, the transformation generation component 115a-3 can generate a transformation that can be used to transform the beginning state of the named resource to the ending state of the named resource (i.e., for use when applying the transformation as part of addition of a diffgram) and/or to transform the ending state to the beginning state (i.e., for use when applying the transformation as part of subtraction of the diffgram). Thus, the transformation generation component 115a might generate a diffgram that contains any transformation(s) needed to transform the value(s) of any named resource(s) that were altered by the subset between the named resource's beginning and ending values.

If multiple subsets were identified in act 502, and replayed in act 503, then act 504 could also include generating diffgrams for each of these subsets. Thus, for example, the diffgram just discussed could be a first diffgram and act 504 could include generating a second diffgram (e.g., 403d) for the second subset. Thus, act 504 might also comprise, based on replaying the second subset of instructions, generating a second diffgram for the second subset of instructions, the second diffgram being structured such that addition of the diffgram at the third instruction brings the one or more named resources to the fourth state, and subtraction of the diffgram at the fourth instruction brings the one or more named resources to the third state. This could continue for any number of subsets and diffgrams.

Method 500 also includes an act 505 of storing the diffgram. In some embodiments, act 505 comprises storing the diffgram in connection with the trace. For example, the diffgram storage component 115a-4 can store any generated diffgram(s) to a location where they can be accessed during replay of the trace. For example, the diffgram storage component 115a-4 might store one or more diffgram(s) into durable storage associated with the trace (e.g., as part of a recorded execution in durable storage 104), and/or into volatile memory associated with replay of the trace (e.g., system memory 103 utilized by the debugging component 109).

As mentioned, diffgrams can use key frames or other diffgrams as their baseline. For instance, first diffgram 403c is shown as using key frame 402b as its baseline (though it could have alternatively used another diffgram as it baseline). Thus, in method 500 the first diffgram could use a key frame as a baseline, and addition of the diffgram to the key frame could bring the one or more named resources to the second state, while subtraction of the diffgram at the second instruction could bring the one or more named resources to a state stored in the key frame. In this instance, the state stored in the key frame could comprise the first state. While, in this example, the baseline key frame is associated with the trace segment utilized in act 502 (i.e., the segment from key frame 402b to key frame 402c), the baseline key frame could alternatively be associated with a different trace segment (e.g., the segment from key frame 402a to key frame 402b).

In addition, the second diffgram 403d is shown as using diffgram 403c as its baseline. Thus, in method 500 the second diffgram could use the first diffgram as a baseline, and subtraction of the second diffgram at the fourth instruction could bring the one or more named resources to the third state (which might also be the second state, depending on implementation). In this case, addition of the first and second diffgrams at the first instruction could bring the one or more named resources to the fourth state, and subtraction of the first and second diffgrams at the fourth instruction could bring the one or more named resources to the first state (i.e., since diffgrams are composable). However, it would also be possible for the second diffgram to use the key frame as its baseline. Thus, the second diffgram might have alternatively used the key frame as a baseline, and subtraction of the second diffgram at the fourth instruction could bring the one or more named resources to a state stored in the key frame.

Each generated diffgram could be a complete or a partial diffgram. Thus, if the first diffgram was a complete diffgram, the second state could include a state change made by a second thread of the plurality of threads (e.g., data stream 401b) after the first instruction. If the first diffgram was partial diffgram, the second state could omit a state change made by a second thread of the plurality of threads (e.g., data stream 401b) after the first instruction. Stated differently, for a partial diffgram, the second state might include only state changes made by the first thread (e.g., data stream 401a).

As will be appreciated, method 500 can be repeated any number of times on any number of threads and/or trace segments. As such, method 500 could be used to create each diffgram shown in FIG. 4A.

Figure 6:
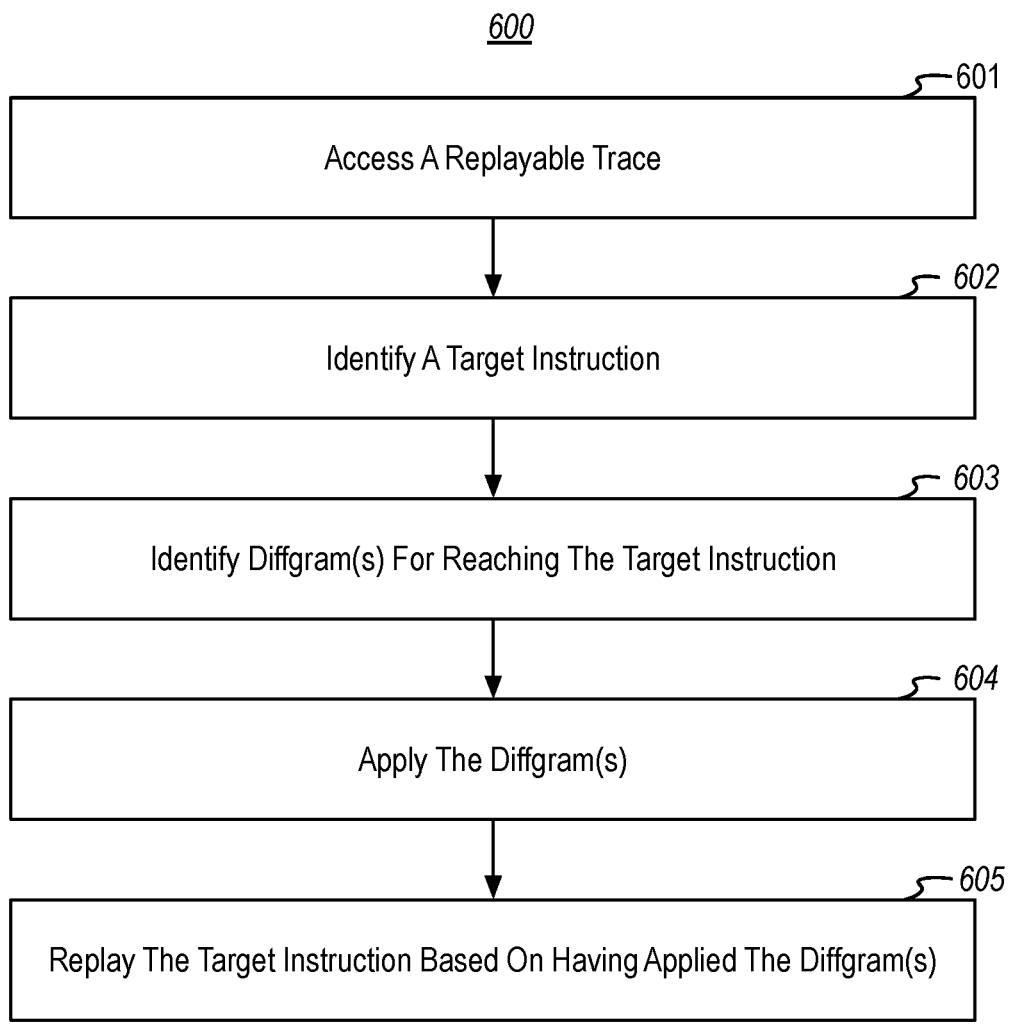
FIG. 6 illustrates a flow chart of an example method for utilizing a diffgram to replay a trace.

In accordance with embodiments for replaying a trace in reliance on diffgrams, FIG. 6 illustrates a flowchart of an example method 600 for utilizing a diffgram to replay a trace. Method 600 will now be described within the context of with FIGS. 1-5. In embodiments, method 600 might be performed after performance of method 500, leveraging any diffgram(s) created using method 500 (e.g., diffgrams 403a-403o). As such, method 600 could be viewed as being a separate method, or an extension of method 500, such that methods 500 and 600 are parts of a single larger method that combines indexing and replay. While, for ease in description, the acts of method 600 are shown in a particular sequential order, it will be appreciated that some of these acts might be implemented in different orders, and/or in parallel.

As shown in FIG. 6, method 600 includes an act 601 of accessing a replayable trace. In some embodiments, act 601 comprises accessing a replayable trace that records a prior execution of one or more threads of an entity. For example, act 601 might operate substantially similarly to act 501 of method 500.

Method 600 also includes an act 602 of identifying a target instruction. In some embodiments, act 602 comprises identifying, within the replayable trace, a particular instruction within a trace segment recording a prior execution of a sequence of a plurality of instructions of a first thread of the one or more threads, the plurality of instructions including the particular instruction. For example, the emulation component 116 can identify a particular instruction of interest in the trace accessed in act 601. For instance, the emulation component 116 might identify one of POIs 404.

Method 600 also includes an act 603 of identifying diffgram(s) for reaching the target instruction. In some embodiments, act 603 comprises identifying a set of one or more diffgrams for restoring a prior state of one or more named resources that is needed for emulating the prior execution of the particular instruction. For example, the diffgram identification component 116b-1 can identify any diffgram(s) needed to access the PIO 404 identified in act 603. The particular diffgram(s) identified can depend on what prior state is already available.

As an example, to jump to POI 404a, the diffgram identification component 116b-1 might identify diffgram 403c (which is based on key frame 402b) and diffgram 403f. To jump to POI 404b, the diffgram identification component 116b-1 might identify diffgrams 403c, 403f, and 403g. To jump to POI 404c, the diffgram identification component 116b-1 might identify diffgrams 403c, 403f, and 403i.

As another example, if the emulation component 116 has already reconstructed state for POI 404a, the diffgram identification component 116b-1 can identify diffgram 403g to skip forward to POI 404b, or identify diffgram 403i to skip forward to PIO 404c.

As yet another example, if the emulation component 116 has already reconstructed state for POI 404c, the diffgram identification component 116b-1 can identify diffgram 403i to skip backward to POI 404a, or identify diffgrams 403i and 403g to skip backward to PIO 404b.

Method 600 also includes an act 604 of applying the diffgram(s). In some embodiments, act 604 comprises applying the set of one or more diffgrams to restore the prior state of the one or more named resources. For example, applying diffgrams can include adding and/or subtracting diffgrams from a known/restored state. This can include adding one or more diffgrams to a known/restored prior state of the one or more named resources, or subtracting the one or more diffgrams from the known/restored prior state of the one or more named resources. In embodiments, applying the set of one or more diffgrams to restore the prior state of the one or more named resources is accomplished without emulating any instructions.

As an example, in act 604 applying the set of one or more diffgrams to restore the prior state of the one or more named resources might comprise adding the set of one or more diffgrams to a state of the one or more named resources that is obtained from a key frame associated with the trace segment, or within another trace segment. For instance, to jump to POI 404a, the diffgram application component 116b-2 might recover state from key frame 402b, and then add diffgrams 403c and 403f. To jump to POI 404b, the diffgram application component 116b-2 might recover state from key frame 402b and then add diffgrams 403c, 403f, and 403g. To jump to POI 404c, the diffgram application component 116b-2 might recover state from key frame 402b, and then add diffgrams 403c, 403f, and 403i.

As another example, in act 604 applying the set of one or more diffgrams to restore the prior state of the one or more named resources might comprise adding the set of one or more diffgrams to a state of the one or more named resources that is obtained from another diffgram that restores state to an instruction that is at, or prior to, the particular instruction in the sequence of instructions. For instance, to skip forward to POI 404b from POI 404a, the diffgram application component 116b-2 might add diffgram 403g, and to skip forward to POI 404c from POI 404a the diffgram application component 116b-2 might add diffgram 403i.

As yet another example, in act 604 applying the set of one or more diffgrams to restore the prior state of the one or more named resources might comprise subtracting the set of one or more diffgrams from a state of the one or more named resources at an instruction that is subsequent to the particular instruction in the sequence of instructions. For instance, to skip backward from POI 404c to POI 404a, the diffgram application component 116b-2 might subtract diffgram 403i, and to skip backward from POI 404c to POI 404b the diffgram application component 116b-2 might subtract diffgram 403i then add diffgram 403g.

Method 600 also includes an act 605 of replaying the target instruction based on having applied the diffgram(s). In some embodiments, act 605 comprises, after applying the set of one or more diffgrams, emulating the prior execution of the particular instruction based on the restored prior state of the one or more named resources. For example, adding and/or subtracting diffgrams in act 604, the emulation component 116 can initiate replay from the point reached by the adding/subtracting of diffgrams, and use the emulation steering component 116a to steer instruction execution as per the trace.

As an example, to replay the instruction at POI 404a, the emulation component 116 might initiate replay at POI 404 after the diffgram component 116b recovered state from key frame 402b and added diffgrams 403c and 403f. To replay the instruction at POI 404b, the emulation component 116 might initiate replay at, or after, the ending bounding instruction for diffgram 403g after the diffgram component 116b recovered state from key frame 402b and added diffgrams 403c, 403f, and 403g. To replay the instruction at POI 404c, the emulation component 116 might initiate replay at POI 404c after the diffgram component 116b recovered state from key frame 402b and added diffgrams 403c, 403f, and 403i.

As another example, to replay the instruction at POI 404b after having skipped forward from POI 404a, the emulation component 116 might initiate replay at, or after, the ending bounding instruction for diffgram 403g after the diffgram component 116b added diffgram 403g. To replay the instruction at POI 404c after having skipped forward from POI 404a, the emulation component 116 might initiate replay at POI 404c after the diffgram component 116b added diffgram 403i.

As yet another example, to replay the instruction at POI 404a after having skipped backward from POI 404c, the emulation component 116 might initiate replay at POI 404a after the diffgram component 116b subtracted diffgram 403i. To replay the instruction at POI 404b after having skipped backward from POI 404c, the emulation component 116 might initiate replay at, or after, the ending bounding instruction for diffgram 403g after the diffgram component 116b subtracted diffgram 403i and added diffgram 403g.

As will be appreciated, the diffgram(s) utilized by method 600 can be obtained from the trace itself (e.g., inserted by an offline indexing process), and/or from having previously replayed the trace segment (e.g., generated on-the-fly).

As mentioned, a diffgram can be used as a reverse lookup data structure for determining which named resources were modified at the ending bounding instruction as compared to the beginning bounding instruction. If the diffgram is augmented with memory locations written to by intermediary instructions, this diffgram can provide even further coverage of named resources that were touched by intermediary instructions, but which had the same value at the beginning and ending bounding instructions. Either way, method 600 might include identifying, from the set of one or more diffgrams, one or more named resources that were modified by instructions covered by the set of one or more diffgrams. In addition, a diffgram might even be augmented with data as to which named resources were read by instructions covered by the diffgram. In this case, method 600 might include identifying, from the set of one or more diffgrams, one or more named resources that were touched by instructions covered by the set of one or more diffgrams.

Figure 7:
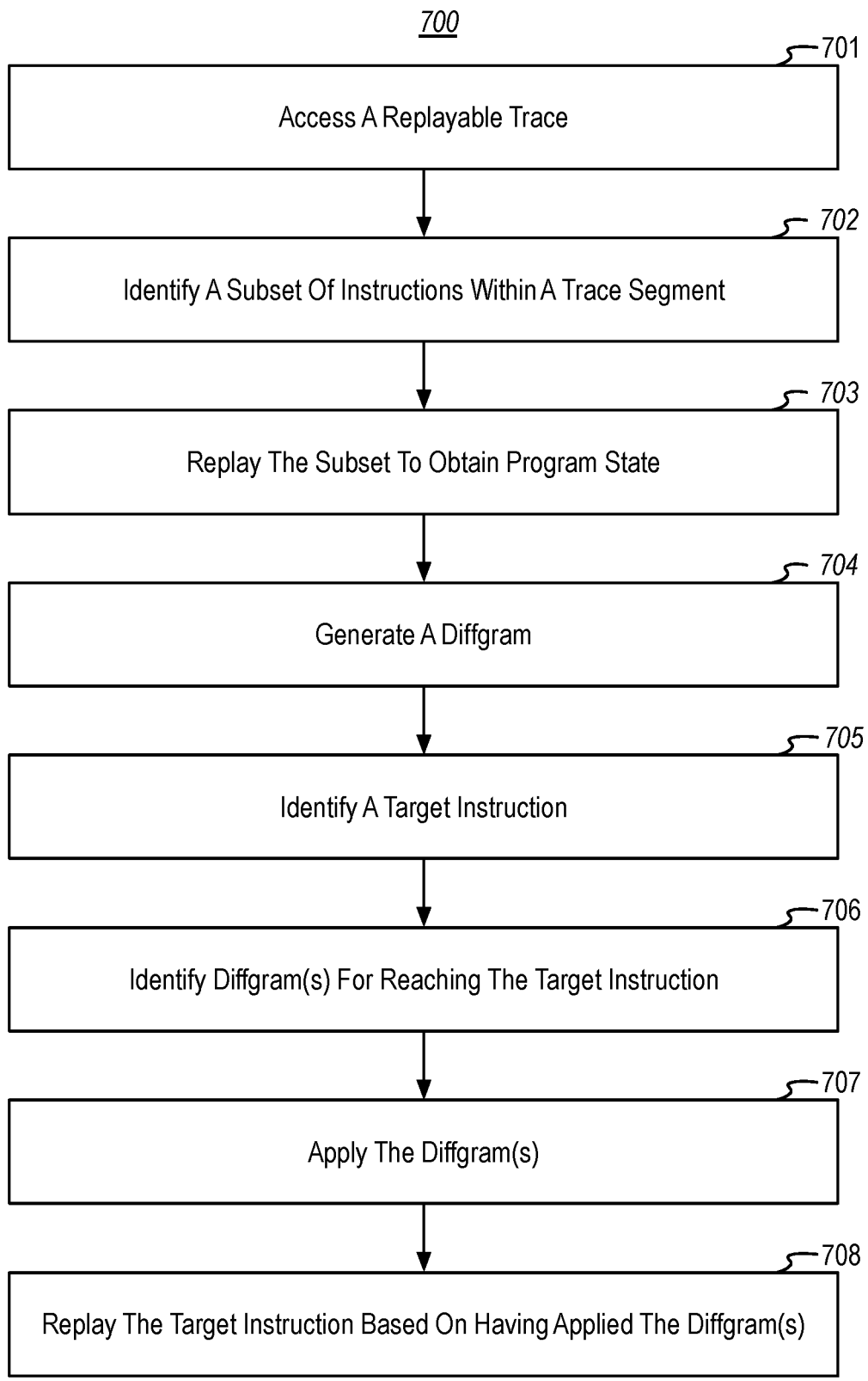
FIG. 7 illustrates a flow chart of an example method for generating and utilizing diffgrams during trace replay.

As mentioned, methods 500 and 600 could be viewed as being parts of a single larger method that combines indexing and replay. To illustrate this, FIG. 7 illustrates a flowchart of an example method 700 for generating and utilizing diffgrams during trace replay. Method 700 will now be described within the context of with FIGS. 1-6. While, for ease in description, the acts of method 700 are shown in a particular sequential order, it will be appreciated that some of these acts might be implemented in different orders, and/or in parallel.

As shown in FIG. 7, method 700 includes an act 701 of accessing a replayable trace. In some embodiments, act 701 comprises accessing a replayable trace that records a prior execution of an entity. For example, act 701 might correspond generally to act 501 of FIG. 5.

Method 700 also includes an act 702 of identifying a subset of instructions within a trace segment. In some embodiments, act 702 comprises identifying, within a trace segment recording a prior execution of a sequence of a plurality of instructions of the entity, a subset of the sequence of instructions, the subset of instructions beginning with a first instruction and ending with a second instruction. For example, act 702 might correspond generally to act 502 of FIG. 5.

Method 700 also includes an act 703 of replaying the subset to obtain program state. In some embodiments, act 703 comprises replaying the subset of instructions to obtain state of one or more named resources, the one or more named resources having a first state at the first instruction and a different second state at the second instruction. For example, act 703 might correspond generally to act 503 of FIG. 5.

Method 700 also includes an act 704 of generating a diffgram. In some embodiments, act 704 comprises, based on replaying the subset of instructions, generating a diffgram for the subset of instructions, the diffgram being structured such that addition of the diffgram at the first instruction brings the one or more named resources to the second state, and subtraction of the diffgram at the second instruction brings the one or more named resource to the first state. For example, act 704 might correspond generally to act 504 of FIG. 5.

Method 700 also includes an act 705 of identifying a target instruction. In some embodiments, act 705 comprises, subsequent to generating the diffgram, identifying, within the replayable trace, a particular instruction within the subset of instructions that is to be replayed. For example, act 705 might correspond generally to act 602 of FIG. 6.

Method 700 also includes an act 706 of identifying diffgram(s) for reaching the target instruction. In some embodiments, act 706 comprises identifying the generated diffgram for reaching the particular instruction. For example, act 706 might correspond generally to act 603 of FIG. 6.

Method 700 also includes an act 707 of applying the diffgram(s). In some embodiments, act 707 comprises applying the diffgram at the second instruction to restore the first state of the one or more named resources. For example, act 707 might correspond generally to act 604 of FIG. 6.

Method 700 also includes an act 708 of replaying the target instruction based on having applied the diffgram(s). In some embodiments, act 708 comprises, after applying the diffgram at the second instruction, replaying the subset of instructions, including replaying the particular instruction based on the restored first state of the one or more named resources. For example, act 708 might correspond generally to act 605 of FIG. 6.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a," "an," "the," and "said" are intended to mean there are one or more of the elements. The terms comprising," "including," and "having" are intended to be inclusive and mean that there may be additional elements other than the listed elements.

What is claimed:

1. A method, implemented at a computer system that includes at least one processor, for indexing a trace with a diffgram, the method comprising:
   accessing a replayable trace that records a prior execution of one or more threads of an entity;
   identifying, within a trace segment recording a prior execution of a sequence of a plurality of instructions of a first thread of the one or more threads, a subset of the sequence of instructions, the subset of instructions beginning with a first instruction and ending with a second instruction;
   replaying the subset of instructions to obtain state of one or more named resources, the one or more named resources having a first state at the first instruction and a different second state at the second instruction;
   based on replaying the subset of instructions, generating a diffgram for the subset of instructions, the diffgram comprising one or more reversible mathematical operations on the first state that transform the first state into the second state, such that addition of the diffgram at the first instruction by applying the one or more reversible mathematical operations to the first state brings the one or more named resources to the second state, and subtraction of the diffgram at the second instruction by applying a reversal of the one or more reversible mathematical operations to the second state brings the one or more named resources to the first state; and storing the diffgram in connection with the trace.

2. The method of claim 1, storing the diffgram in connection with the trace comprising at least one of (i) storing the diffgram into durable storage associated with the trace, or (ii) storing the diffgram into volatile memory associated with replay of the trace.

3. The method of claim 1, the diffgram using a key frame as a baseline, addition of the diffgram to the key frame bringing the one or more named resources to the second state, and subtraction of the diffgram at the second instruction bringing the one or more named resources to a state stored in the key frame.

4. The method of claim 3, wherein the state stored in the key frame comprises the first state.

5. The method of claim 4, wherein the key frame is associated with the trace segment.

6. The method of claim 1, wherein the second state includes a state change made by a second thread of the plurality of threads after the first instruction.

7. The method of claim 1, wherein the second state omits a state change made by a second thread of the plurality of threads after the first instruction.

8. The method of claim 1, the subset of instructions comprising a first subset of instructions, and the diffgram comprising a first diffgram, the method further comprising:
identifying, within the trace segment, second a subset of the sequence of instructions, the second subset of instructions beginning with a third instruction and ending with a fourth instruction replaying the second subset of the sequence of instructions to obtain state of the one or more named resources, the one or more named resources having a third state at the third instruction and a different fourth state at the fourth instruction; and based on replaying the second subset of instructions, generating a second diffgram for the second subset of instructions, the second diffgram being structured such that addition of the diffgram at the third instruction brings the one or more named resources to the fourth state, and subtraction of the diffgram at the fourth instruction brings the one or more named resources to the third state.

9. The method of claim 8, the second diffgram using a key frame as a baseline, subtraction of the second diffgram at the fourth instruction bringing the one or more named resources to a state stored in the key frame.

10. The method of claim 8, the second diffgram using the first diffgram as a baseline, and subtraction of the second diffgram at the fourth instruction bringing the one or more named resources to the third state.

11. The method of claim 8, addition of the first and second diffgrams at the first instruction bringing the one or more named resources to the fourth state, and subtraction of the first and second diffgrams at the fourth instruction bringing the one or more named resources to the first state.

12. A method, implemented at a computer system that includes at least one processor, for utilizing a diffgram to replay a trace, the method comprising:

accessing a replayable trace that records a prior execution of one or more threads of an entity;

identifying, within the replayable trace, a particular instruction within a trace segment recording a prior execution of a sequence of a plurality of instructions of a first thread of the one or more threads, the plurality of instructions including the particular instruction;

identifying a set of one or more diffgrams for restoring a first state of one or more named resources that is needed for emulating the prior execution of the particular instruction, the set of one or more diffgrams comprising one or more reversible mathematical operations on the first state that transform the first state into a second state, such that addition of the diffgram by applying the one or more reversible mathematical operations to the first state brings the one or more named resources to the second state, and subtraction of the diffgram by applying a reversal of the one or more reversible mathematical operations to the second state brings the one or more named resources to the first state;

applying the set of one or more diffgrams to restore the first state of the one or more named resources; and after applying the set of one or more diffgrams, emulating the prior execution of the particular instruction based on the restored first state of the one or more named resources.

13. The method of claim 12, applying the set of one or more diffgrams to restore the first state of the one or more named resources comprising adding the set of one or more diffgrams to a state of the one or more named resources that is obtained from a key frame associated with the trace segment, or within another trace segment.

14. The method of claim 12, applying the set of one or more diffgrams to restore the first state of the one or more named resources comprising adding the set of one or more diffgrams to a state of the one or more named resources that is obtained from another diffgram that restores state to an instruction that is at, or prior to, the particular instruction in the sequence of instructions.

15. The method of claim 12, applying the set of one or more diffgrams to restore the first state of the one or more named resources comprising subtracting the set of one or more diffgrams from a state of the one or more named resources at an instruction that is subsequent to the particular instruction in the sequence of instructions.

16. The method of claim 12, applying the set of one or more diffgrams to restore the first state of the one or more named resources comprising adding a plurality of diffgrams to a restored prior state of the one or more named resources, or subtracting the plurality of diffgrams from the restored prior state of the one or more named resources.

17. The method of claim 12, at least one diffgram being obtained from the trace, or from having previously replayed the trace segment.

18. The method of claim 12, further comprising identifying, from the set of one or more diffgrams, one or more named resources that were modified by instructions covered by the set of one or more diffgrams.

19. The method of claim 12, wherein applying the set of one or more diffgrams to restore the first state of the one or more named resources comprises restoring the first state of the one or more named resources without emulating any instructions.

20. A computer system comprising:
a processor; and
a computer-readable medium having stored thereon computer-executable instructions that are executable by the processor to cause the computer system to generate and utilize diffgrams during trace replay, the computer-executable instructions including instructions that are executable by the processor to cause the computer system to at least:

access a replayable trace that records a prior execution of an entity;

identify, within a trace segment recording a prior execution of a sequence of a plurality of instructions of the entity, a subset of the sequence of instructions, the subset of instructions beginning with a first instruction and ending with a second instruction;

replay the subset of instructions to obtain state of one or more named resources, the one or more named resources having a first state at the first instruction and a different second state at the second instruction;

based on replaying the subset of instructions, generate a diffgram for the subset of instructions, the diffgram comprising one or more reversible mathematical operations on the first state that transform the first state into the second state, such that addition of the diffgram at the first instruction by applying the one or more reversible mathematical operations to the first state brings the one or more named resources to the second state, and subtraction of the diffgram at the second instruction by applying a reversal of the one or more reversible mathematical operations to the second state brings the one or more named resources to the first state;

subsequent to generating the diffgram, identify, within the replayable trace, a particular instruction within the subset of instructions that is to be replayed;

identify the generated diffgram for reaching the particular instruction;

apply the diffgram at the second instruction to restore the first state of the one or more named resources; and after applying the diffgram at the second instruction, replay the subset of instructions, including replaying the particular instruction based on the restored first state of the one or more named resources.

* * * * *